United States Patent [19]
Gleim et al.

[11] Patent Number: 6,072,544
[45] Date of Patent: Jun. 6, 2000

[54] METHOD FOR OBTAINING SIGNALS IN ELECTRONIC DEVICES BY MEANS OF INTERPOLATION BETWEEN INTERPOLATION POINT VALUES

[75] Inventors: Guenter Gleim; Friedrich Heizmann; Bernd Rekla, all of Villingen-Schwenningen, Germany

[73] Assignee: Deutsche Thomson Brandt GmbH, Villingen-Schwenningen, Germany

[21] Appl. No.: 08/822,155

[22] Filed: Mar. 17, 1997

[30] Foreign Application Priority Data

Mar. 21, 1996 [DE] Germany ............ 198 11 059

[51] Int. Cl.[7] ............... H04N 3/22; H04N 9/28
[52] U.S. Cl. ............ 348/745; 348/807; 315/368.13
[58] Field of Search .............. 348/745–747, 348/806–807; 315/368.12, 368.13, 368.11; H04N 3/22, 3/26, 9/28

[56] References Cited

U.S. PATENT DOCUMENTS

| | | |
|---|---|---|
| 5,398,083 | 3/1995 | Tsujihara et al. ............ 348/807 |
| 5,463,427 | 10/1995 | Kawashima . |

FOREIGN PATENT DOCUMENTS

| | | | |
|---|---|---|---|
| 0626794 | 11/1994 | European Pat. Off. ....... | H04N 9/28 |
| 0671853 | 9/1995 | European Pat. Off. ....... | H04N 9/28 |
| 3913634 | 10/1990 | Germany ................. | H04N 9/28 |
| 62-193476 | of 0000 | Japan ..................... | H04N 9/28 |
| 63-221788 | of 0000 | Japan ..................... | H04N 9/28 |
| WO90/05428 | 5/1990 | WIPO .................... | H04N 9/28 |

OTHER PUBLICATIONS

Copy of Search Report.
Stanke, Gerd Schnelle geometrische Bildkorrektur unit dem parallelen Prozzessor des BVS A 6472 Bild und Ton 43, 1990, 2, S.48,49.
Shiomi, Makoto et al. A Fully Digital Convergence System for Projection TV, In IEEE Tranaction on Consumer Electronics, vol. 36, No. 3, Aug. 1990 S 45–452.

*Primary Examiner*—Michael H. Lee
*Attorney, Agent, or Firm*—Joseph S. Tripoli; Joseph J. Laks; Harvey D. Fried

[57] ABSTRACT

A method is proposed for obtaining signals in electronic devices by means of interpolation between interpolation point values (W0 to W12), the interpolation point values (W0 to W12) being distributed linearly over a region. A number of interpolation values are calculated in each case at a specific interval between the interpolation point values (W0 to W12). The calculation of the interpolation values is then performed as follows: Firstly, a correction step value (a to 1) is determined in each case for an interval bounded by two interpolation point values (W0 to W12) by linear interpolation between these interpolation point values (W0 to W12). These correction step values (a to 1) are calculated for all intervals. The calculation of the interpolation value in the current interval is then performed such that apart from the correction step value (a to 1) for the current interval use is also made at least of the correction step value (a to 1) of the preceding and/or of the following interval. As a result, the interpolation curve is laid smoothly through the intervals, and pronounced discontinuities in the gradient of the interpolation curve are avoided.

24 Claims, 9 Drawing Sheets

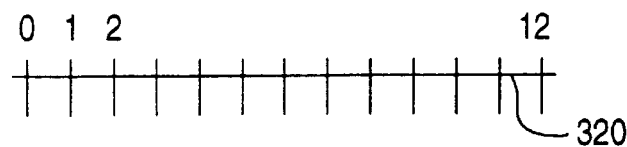
Fig.6
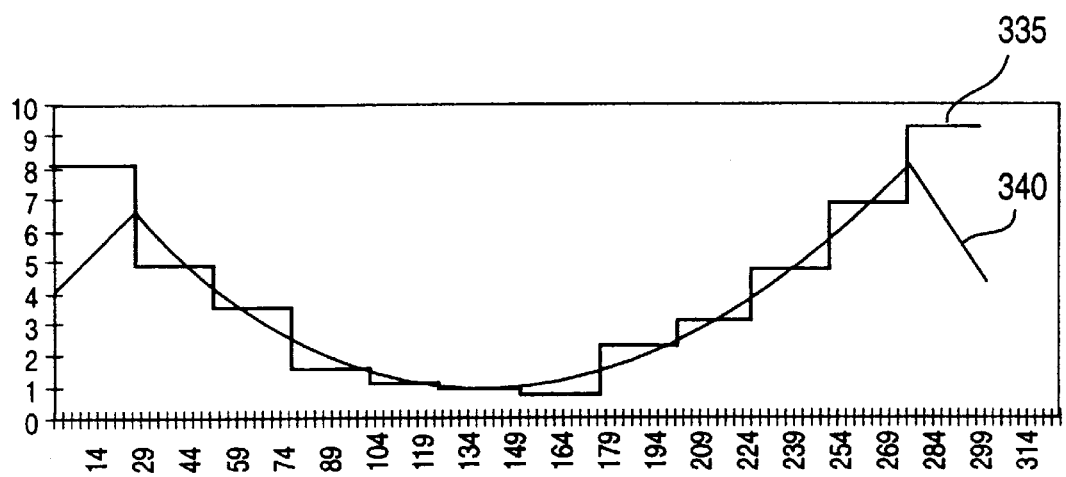
Fig.10
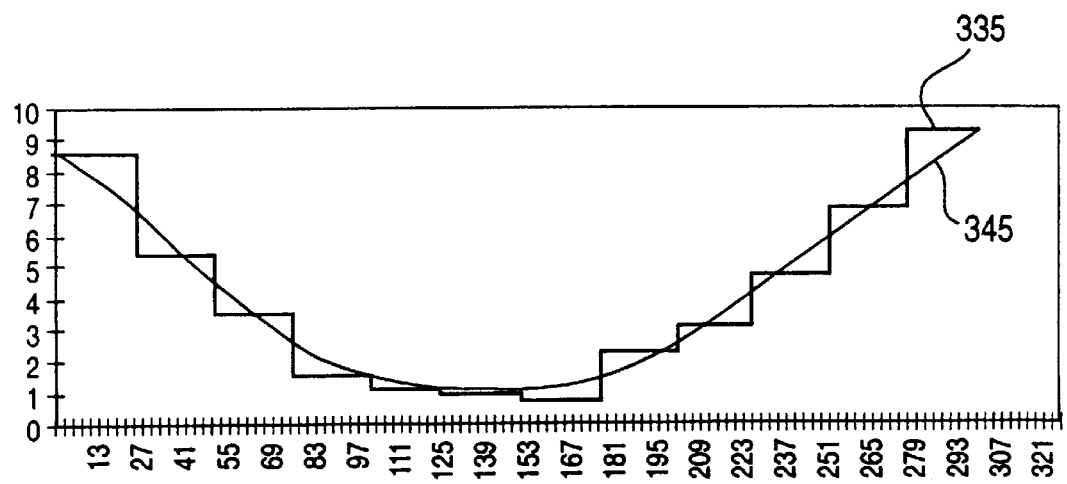
Fig.12

Z=5 im01 —— 299　　　　　im01=3W0-3W1+W2 m=(W0-im01)/Z  m {

(K) (L) (P) (Q) (R) (V)

W0 —— 300

| (K) | (L) | (P) | (Q) | (R) | (V) | |
|---|---|---|---|---|---|---|
| 0 | 5 | 0 | m | a | 0 | U1=W0-m+(P•K+Q•L+R•L+V•K)/(2•Z) |
| 1 | 4 | a | m | a | b | U2= U1 + (P•K+Q•L+R•L+V•K)/(2•Z) |
| 2 | 3 | a | m | a | b | U3= U2 + (P•K+Q•L+R•L+V•K)/(2•Z) |
| 3 | 2 | a | m | a | b | U4= U3 + (P•K+Q•L+R•L+V•K)/(2•Z) | a=(W1-W0)/Z  a {

W1 —— 301

| 4 | 1 | a | m | a | b |
| 5 | 0 | a | 0 | 0 | b |
| 4 | 1 | a | b | c | b | b=(W2-W1)/Z  b {

| 3 | 2 | a | b | c | b |
| 2 | 3 | a | b | c | b |
| 1 | 4 | a | b | c | b |

W2 —— 302

| 0 | 5 | 0 | b | c | 0 |
| 1 | 4 | c | b | c | d | c=(W3-W2)/Z  c {

| 2 | 3 | c | b | c | d |
| 3 | 2 | c | b | c | d |

W3 —— 303

| 4 | 1 | c | b | c | d |
| 5 | 0 | c | 0 | 0 | d |
| 4 | 1 | c | d | e | d | d=(W4-W3)/Z  d {

| 3 | 2 | c | d | e | d |
| 2 | 3 | c | d | e | d |

W4 —— 304

| 1 | 4 | c | d | e | d |
| 0 | 5 | 0 | d | e | 0 |

•
•
• —— 305

W10

| 0 | 5 | 0 | j | k | 0 |
| 1 | 4 | k | j | k | l | k=(W11-W10)/Z  k {

| 2 | 3 | k | j | k | l |
| 3 | 2 | k | j | k | l |

—— 306

W11 ——

| 4 | 1 | k | j | k | l |
| 5 | 0 | k | 0 | 0 | l |
| 4 | 1 | k | l | n | l | l=(W12-W11)/Z  l {

| 3 | 2 | k | l | n | l |
| 2 | 3 | k | l | n | l |

W12 —— 307

| 1 | 4 | k | l | n | l |
| 0 | 5 | 0 | l | n | 0 | n=(im13-W12)/Z  n { im02 —— 308　　　　　im02=3W12-3W11+W10

| | | | (K) | (L) | (M) | (P) | (Q) | (V) | |
|---|---|---|---|---|---|---|---|---|---|
| | ------ | | 5 | 0 | 5 | 0 | a | 0 | $\sum P \cdot K = 0$ |
| Z=5 | ------ | | 5 | 1 | 4 | 0 | a | 0 | $\sum V \cdot M = 0$ |
| | ------ | | 5 | 2 | 3 | 0 | a | 0 | $\sum Q \cdot L = a \cdot \dfrac{(Z-1)^2 + (Z-1)}{2}$ |
| | ------ | | 5 | 3 | 2 | 0 | a | 0 | |
| | ------ 300 | | 5 | 4 | 1 | 0 | a | 0 | |
| | W0 | | 5 | 5 | 0 | 0 | a | 0 | U1= W0+($\sum Q \cdot L$)/(K+L+M) |
| | ——— | | 4 | 5 | 1 | 0 | a | b | U2= U1+(P·K+Q·L+V·M)/(K+L+M) |
| a=(W1-W0)/Z | a { ——— | | 3 | 5 | 2 | 0 | a | b | U3= U2+(P·K+Q·L+V·M)/(K+L+M) |
| | ——— | | 2 | 5 | 3 | 0 | a | b | U4= U3+(P·K+Q·L+V·M)/(K+L+M) |
| | ——— 301 | | 1 | 5 | 4 | 0 | a | b | |
| | W1 | | 0 | 5 | 5 | 0 | a | b | |
| | ——— | | 1 | 4 | 5 | c | a | b | ⋮ |
| b=(W2-W1)/Z | b { ——— | | 2 | 3 | 5 | c | a | b | |
| | ——— | | 3 | 2 | 5 | c | a | b | |
| | ——— 302 | | 4 | 1 | 5 | c | a | b | |
| | W2 | | 5 | 0 | 5 | c | 0 | b | |
| | ——— | | 5 | 1 | 4 | c | d | b | |
| c=(W3-W2)/Z | c { ——— | | 5 | 2 | 3 | c | d | b | |
| | ——— | | 5 | 3 | 2 | c | d | b | |
| | ——— 303 | | 5 | 4 | 1 | c | d | b | |
| | W3 | | 5 | 5 | 0 | c | d | 0 | |
| | ——— | | 4 | 5 | 1 | c | d | e | |
| d=(W4-W3)/Z | d { ——— | | 3 | 5 | 2 | c | d | e | |
| | ——— | | 2 | 5 | 3 | c | d | e | |
| | ——— 304 | | 1 | 5 | 4 | c | d | e | |
| | W4 | | 0 | 5 | 5 | 0 | d | e | |
| | ⋮ 305 | | ⋮ | | | | | | |
| | W10 | | 0 | 5 | 5 | 0 | j | k | |
| | ——— | | 1 | 4 | 5 | l | j | k | |
| k=(W11-W10)/Z | k { ——— | | 2 | 3 | 5 | l | j | k | |
| | ——— | | 3 | 2 | 5 | l | j | k | |
| | ——— 306 | | 4 | 1 | 5 | l | j | k | |
| | W11 | | 5 | 0 | 5 | l | 0 | k | |
| | ——— | | 5 | 1 | 4 | l | 0 | k | |
| l=(W12-W11)/Z | l { ——— | | 5 | 2 | 3 | l | 0 | k | |
| | ——— | | 5 | 3 | 2 | l | 0 | k | |
| | ——— 307 | | 5 | 4 | 1 | l | 0 | k | |
| | W12 | | 5 | 5 | 0 | l | 0 | k | |

|  |  | (K) | (L) | (M) | (P) | (Q) | (V) |  |
|---|---|---|---|---|---|---|---|---|
| Z=5 | ----- | 5 | 0 | 5 | 0 | a | 0 | ⎫ |
|  | ----- | 5 | 1 | 4 | 0 | a | 0 | ⎬ Q•L = a•L/(K+L+M) |
|  | ----- | 5 | 2 | 3 | 0 | a | 0 | ⎬ Q•L = a•L/(K+L+M) |
|  | ----- | 5 | 3 | 2 | 0 | a | 0 | ⎬ Q•L = a•L/(K+L+M) |
|  | ----- | 5 | 4 | 1 | 0 | a | 0 | ⎭ Q•L = a•L/(K+L+M) |
| W0 ∠300 |  | 5 | 5 | 0 | 0 | a | 0 | U1= W0+(P•K+Q•L+V•M)/(K+L+M) |
|  |  | 4 | 5 | 1 | 0 | a | b | U2= U1+(P•K+Q•L+V•M)/(K+L+M)+a•K/(2•Z) |
| a=(W1-W0)/Za { |  | 3 | 5 | 2 | 0 | a | b | U3= U2+(P•K+Q•L+V•M)/(K+L+M)+a•K/(2•Z) |
|  |  | 2 | 5 | 3 | 0 | a | b | U4= U3+(P•K+Q•L+V•M)/(K+L+M)+a•K/(2•Z) |
|  |  | 1 | 5 | 4 | 0 | a | b | U5= U4+(P•K+Q•L+V•M)/(K+L+M)+a•K/(2•Z) |
| W1 ∠301 |  | 0 | 5 | 5 | 0 | a | b | U6= U5+(P•K+Q•L+V•M)/(K+L+M) |
|  |  | 1 | 4 | 5 | c | a | b | U7= U6+(P•K+Q•L+V•M)/(K+L+M) |
| b=(W2-W1)/Z b{ |  | 2 | 3 | 5 | c | a | b |  |
|  |  | 3 | 2 | 5 | c | a | b |  |
|  |  | 4 | 1 | 5 | c | a | b | • |
| W2 ∠302 |  | 5 | 0 | 5 | c | 0 | b | • |
|  |  | 5 | 1 | 4 | c | d | b | • |
|  |  | 5 | 2 | 3 | c | d | b |  |
| c=(W3-W2)/Z c{ |  | 5 | 3 | 2 | c | d | b |  |
|  |  | 5 | 4 | 1 | c | d | b |  |
| W3 ∠303 |  | 5 | 5 | 0 | c | d | b |  |
|  |  | 4 | 5 | 1 | c | d | e |  |
| d=(W4-W3)/Z d{ |  | 3 | 5 | 2 | c | d | e |  |
|  |  | 2 | 5 | 3 | c | d | e |  |
|  |  | 1 | 5 | 4 | c | d | e |  |
| W4 ∠304 |  | 0 | 5 | 5 | 0 | d | e |  |
| • |  |  |  |  |  |  |  |  |
| • |  |  |  |  |  |  |  |  |
| • |  |  |  |  |  |  |  |  |
| W10 ∠305 |  | 0 | 5 | 5 | 0 | j | k | U51= U50+(P•K+Q•L+V•M)/(K+L+M) |
|  |  | 1 | 4 | 5 | l | j | k | U52= U51+(P•K+Q•L+V•M)/(K+L+M) |
| k=(W11-W10)/Z k{ |  | 2 | 3 | 5 | l | j | k | U53= U52+(P•K+Q•L+V•M)/(K+L+M) |
|  |  | 3 | 2 | 5 | l | j | k | U54= U53+(P•K+Q•L+V•M)/(K+L+M) |
|  |  | 4 | 1 | 5 | l | j | k | U55= U54+(P•K+Q•L+V•M)/(K+L+M) |
| W11 ∠306 |  | 5 | 0 | 5 | l | 0 | k | U56= U55+(P•K+Q•L+V•M)/(K+L+M) |
|  |  | 5 | 1 | 4 | l | 0 | k | U57= U56+(P•K+Q•L+V•M)/(K+L+M)+L•Z/(K+L+M) ⎫ |
|  |  | 5 | 2 | 3 | l | 0 | k | U58= U57+(P•K+Q•L+V•M)/(K+L+M)+L•Z/(K+L+M) ⎬ |
| l=(W12-W11)/Z l{ |  | 5 | 3 | 2 | l | 0 | k | U59= U58+(P•K+Q•L+V•M)/(K+L+M)+L•Z/(K+L+M) ⎬ |
|  |  | 5 | 4 | 1 | l | 0 | k | U60= U59+(P•K+Q•L+V•M)/(K+L+M)+L•Z/(K+L+M) ⎭ |
| W12 ∠307 |  | 5 | 5 | 0 | l | 0 | 0 | U61= U60+(P•K+Q•L+V•M)/(K+L+M)+L•Z/(K+L+M) |
|  | ----- | 4 | 5 | 1 | l | 0 | 0 | p•K = Z•K / (K+L+M) ⎫ |
|  | ----- | 3 | 5 | 2 | l | 0 | 0 | p•K = Z•K / (K+L+M) ⎬ |
|  | ----- | 2 | 5 | 3 | l | 0 | 0 | p•K = Z•K / (K+L+M) ⎬ |
|  | ----- | 1 | 5 | 4 | l | 0 | 0 | p•K = Z•K / (K+L+M) ⎭ |
|  | ----- | 0 | 5 | 5 | l | 0 | 0 |  |

$\alpha = (Z^2+Z)/2$ $\beta = ((Z-1)^2+(Z-1))/2$

| | (W) | (K) | (L) | (M) | (P) | (Q) | (V) | |
|---|---|---|---|---|---|---|---|---|
| W0 ——— 300 | W0 | 0 | 0 | 0 | 0 | a | b | U1= W+(K+1)/2•Q+(M•Q+L•V)/(2•Z) |
| | W0 | 1 | 1 | 4 | 0 | a | b | U2= W+(K+1)/2•Q+(M•Q+L•V)/(2•Z) |
| a=(W1-W0)/Z a { | W0 | 2 | 3 | 7 | 0 | a | b | U3= W+(K+1)/2•Q+(M•Q+L•V)/(2•Z) |
| | W0 | 3 | 6 | 9 | 0 | a | b | U4= W+(K+1)/2•Q+(M•Q+L•V)/(2•Z) |
| W1 ——— 301 | W0 | 4 | 10 | 10 | 0 | a | b | U5= W+(K+1)/2•Q+(M•Q+L•V)/(2•Z) |
| | W1 | 0 | 0 | 0 | a | b | c | U6= W+(-β+M)•P+((α+Z•K)•Q+L•V)/(2•Z) |
| | W1 | 1 | 1 | 4 | a | b | c | U7= W+(-β+M)•P+((α+Z•K)•Q+L•V)/(2•Z) |
| b=(W2-W1)/Z b{ | W1 | 2 | 3 | 7 | a | b | c | U8= W+(-β+M)•P+((α+Z•K)•Q+L•V)/(2•Z) |
| | W1 | 3 | 6 | 9 | a | b | c | U9= W+(-β+M)•P+((α+Z•K)•Q+L•V)/(2•Z) |
| | W1 | 4 | 10 | 10 | a | b | c | U10= W+(-β+M)•P+((α+Z•K)•Q+L•V)/(2•Z) |
| W2 ——— 302 | W2 | 0 | 0 | 0 | b | c | d | U11= W+(-β+M)•P+((α+Z•K)•Q+L•V)/(2•Z) |

⋮

| | | | | | | | | |
|---|---|---|---|---|---|---|---|---|
| W10 ——— 305 | W10 | 0 | 0 | 0 | j | k | l | U51= W+((-β+M)•P+((α+Z•K)•Q+L•Q)/(2•Z) |
| | W10 | 1 | 1 | 4 | j | k | l | U52= W+((-β+M)•P+((α+Z•K)•Q+L•Q)/(2•Z) |
| k=(W11-W10)/Z k { | W10 | 2 | 3 | 7 | j | k | l | U53= W+((-β+M)•P+((α+Z•K)•Q+L•Q)/(2•Z) |
| | W10 | 3 | 6 | 9 | j | k | l | U54= W+((-β+M)•P+((α+Z•K)•Q+L•Q)/(2•Z) |
| W11 ——— 306 | W10 | 4 | 10 | 10 | j | k | l | U55= W+((-β+M)•P+((α+Z•K)•Q+L•Q)/(2•Z) |
| | W11 | 0 | 0 | 0 | k | l | 0 | U56= W+((-β+M)•P+(α+Z•K+L)•Q)/(2•Z) |
| | W11 | 1 | 1 | 4 | k | l | 0 | U57= W+((-β+M)•P+(α+Z•K+L)•Q)/(2•Z) |
| l=(W12-W11)/Z l { | W11 | 2 | 3 | 7 | k | l | 0 | U58= W+((-β+M)•P+(α+Z•K+L)•Q)/(2•Z) |
| | W11 | 3 | 6 | 9 | k | l | 0 | U59= W+((-β+M)•P+(α+Z•K+L)•Q)/(2•Z) |
| W12 ——— 307 | W11 | 4 | 10 | 10 | k | l | 0 | U60= W+((-β+M)•P+(α+Z•K+L)•Q)/(2•Z) |
| | W12 | 0 | 0 | 0 | l | 0 | 0 | U61= W+((-β+α)•P+α•P)/2•Z |

Fig.13

METHOD FOR OBTAINING SIGNALS IN ELECTRONIC DEVICES BY MEANS OF INTERPOLATION BETWEEN INTERPOLATION POINT VALUES

The invention relates to a method for obtaining signals in electronic devices by means of interpolation between interpolation point values.

1. Prior Art

The invention proceeds from a method for obtaining signals by means of interpolation between interpolation point values according to the generic concept of the independent claim 1. A method for obtaining signals by means of interpolation between interpolation point values has already been disclosed in U.S. Pat. No. 5,345,280. It is known from this to provide a grid system for the visible screen region in the case of a video projector and to store correction interpolation point values in a memory. The correction interpolation point values are exactly determined in each case only for the points of a dissection of the grid lines. During operation of the video projector, the correction interpolation point values are then read out synchronously with the movement of the electron beams of the three projection tubes. The associated correction voltages for the projection tubes are then generated by an analogue/digital conversion. However, further values must be determined between two correction interpolation point values. One possibility for this is linear interpolation between two correction interpolation point values. This possibility is represented in FIG. 3 of the U.S. patent. However, a disadvantage which emerges in the case of this method is that the interpolation straight lines of neighbouring grid fields have different gradients, and so discontinuities in the gradients of the interpolation straight lines occur in each case upon transition from one grid field to the next. These discontinuities have a negative effect on the image quality. Specifically, regions of different brightness are then discernible in the image. It is proposed in U.S. Pat. No. 5,345,280 for the purpose of solving this problem to lay the interpolation curves smoothly through the individual correction interpolation point values. The interpolation curves are then calculated such that, firstly, they exactly hit the correction interpolation point values and that, secondly, the adjoining interpolation curves referred to a correction interpolation point value are determined such that their first and second derivatives correspond at the position of the correction interpolation point value. The result of this is that discontinuities in the gradients no longer occur between the interpolation curves and that no regions of different brightness are discernible in the image. The disadvantage of this method is that the determination of the interpolation curves requires a higher outlay on computation which can only be managed using correspondingly expensive arithmetic-logic units.

2. Invention

It is the object of the invention to specify a method for obtaining signals by means of interpolation between interpolation point values which renders it possible to lay the interpolation curve smoothly through the interpolation point values and at the same time manages with relatively simple arithmetic-logic units for calculating the interpolation.

By contrast with the method known from the prior art, the method according to the invention with the features of claim 1 has the advantage that the interpolation curves of adjoining interpolation intervals run over smoothly into one another, only a relatively low outlay on computation being caused for the interpolation. The required chip area in an integrated circuit for implementing the interpolation algorithm remains slight by comparison with other solutions.

It is particularly advantageous that a correction step value is determined in each interpolation interval by linear interpolation between the associated correction interpolation point values. This requires only a low outlay on computation, and the correction step values can advantageously be used in the following calculations. During the interpolation, it is then possible to take account of the correction step values of at least the current interval, the preceding interval and/or the following interval.

Advantageous developments and improvements of the method specified in claim 1 are possible by means of the measures set forth in the dependent claims. It is not always necessary to use the same correction step values in calculating the interpolation values for the entire current interval. The realization can also be selected such that in a specific subregion of the current interval only the correction step value of the preceding and/or of the following interval is taken into account. This renders the method very flexible.

It is advantageous, furthermore, when the correction step values of these interpolation intervals are weighted in accordance with the position of the interpolation value currently to be calculated within the current interval. As a result, the influence of the preceding interval becomes weaker with increasing distance of the position of the interpolation value currently to be calculated from this interval, and vice versa the influence of the following interval becomes stronger with the decreasing distance of the position of the interpolation value currently to be calculated with respect to the following interval. This principle is claimed explicitly in claims 3 to 5.

The decrementation or incrementation of the weights in accordance with claims 6 and 7 is particularly advantageous for implementing the interpolation method by means of integrated circuits. It is likewise advantageous that the weight of the correction step value remains constant for the current interval (see claim 8).

In the case in which when calculating the interpolation values for the current interpolation interval consideration continues always to be given to the correction step values of the preceding interval and the following interval in addition to the current interval, the problem arises that when calculating the correction values in the first interval no correction step values are available from a preceding interval. This problem can be eliminated by adding a correction value as starting value to the first correction interpolation point value when calculating the first interpolation value.

In order further to improve the interpolation, in particular in the edge regions of the region, it is advantageous when calculating the interpolation values to add, at least in the first interval, additional weighted correction step values of the first interval to the generally valid computing rule for calculating the correction values in the further intervals.

It is advantageous in this case when the weights of the additional correction step values decrease with increasing distance of the position of the interpolation value currently to be calculated from the first interpolation value to be calculated. This then causes the curve for the interpolation step values to be raised in the edge regions, and prevents a knee from being produced in this curve upon transition from the first interval to the next interval.

The same principle can also advantageously be applied for the purpose of correcting the said curve of the correction step values in the case of the lowermost interval. The advantageous measures for this are set forth in claims 13 to 14.

The measures of claim 15 prevent "kneeing" of the interpolation curve in the last interpretation step.

Another solution to the edge problem of the interpolation is that at least one interpolation point value is added in each case at the edge of the region. These additional correction interpolation point values can advantageously be calculated from the first or last three correction interpolation point values of the region. Examples of computing formulae for the correction interpolation point values are specified in claims 18 and 19.

The realization of the interpolation algorithm can advantageously be selected such that the calculation of the interpolation values proceeds independently of a previously calculated interpolation value.

On the other hand, the realization of the interpolation algorithm can also be executed such that the interpolation value is respectively determined recursively from the previously calculated interpolation value.

The method can be used very advantageously to obtain the correction voltages in the case of the convergence adjustment of video projectors. In this case, a grid system is laid over the screen region of the video projector. Correction interpolation point values are then stored in a memory for the points of intersection of the grid lines. In order to determine the correction voltages for the video lines between the points of intersection on a vertical grid line, interpolation is performed according to the method presented here. This has the advantage that, by comparison with a linear interpolation method, differences in brightness no longer occur in the individual grid fields, and yet the outlay on computation is kept within limits.

DRAWING

Five exemplary embodiments of the invention are represented in the drawing and explained in more detail in the following description. In the drawing:

FIG. 6 shows the output voltage for convergency correction generated on the basis of the linear interpolation;

FIG. 7 shows a first exemplary embodiment for an improved interpolation method;

FIG. 8 shows a second exemplary embodiment for an improved interpolation method;

FIG. 9 shows a third exemplary embodiment for an improved interpolation method;

FIG. 10 shows a representation of the quality of the interpolation method in accordance with FIG. 9, compared to the linear interpolation method;

FIG. 11 shows a fourth exemplary embodiment for an improved interpolation method;

FIG. 12 shows a representation of the quality of the interpolation method in accordance with FIG. 11 by comparison with the linear interpolation method; and FIG. 13 shows a fifth exemplary embodiment for an improved interpolation method.

DESCRIPTION OF THE INVENTION

Figure 1:
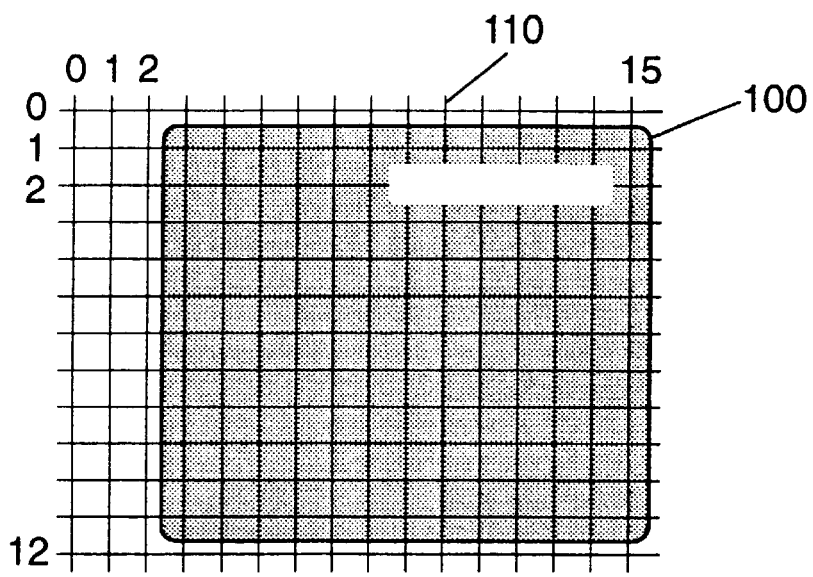
FIG. 1 shows the screen region of a video projector and a grid system laid thereover for the purpose of subdivision.
Figure 2:
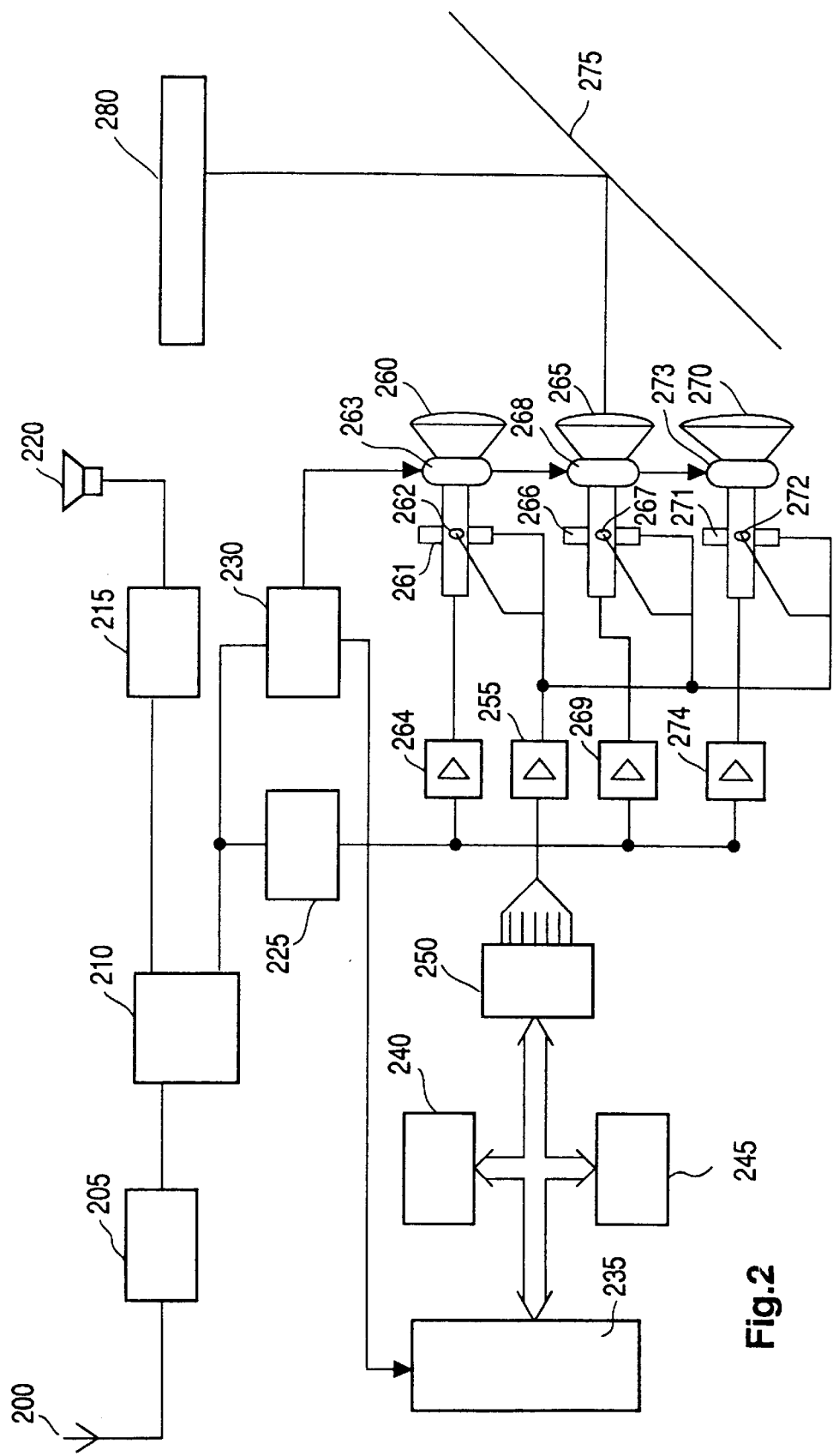
FIG. 2 shows a block diagram of a video projector.

In FIG. 1, the reference symbol 100 denotes the visible image region of a video projector. The reference symbol 110 denotes a grid system which is laid over the image region. This grid system is laid over the screen region only to serve the purpose of convergence adjustment for the video projector. It is not visible in normal operation of the projector. The horizontal lines of the grid system are enumerated from 0 to 12. The vertical lines of the grid system are enumerated from 0 to 15. For the purpose of convergence correction, a correction interpolation point value is respectively stored for each colour red, green and blue at the points of intersection of the grid lines. In this case, different correction interpolation point values are respectively stored for the horizontal convergence correction and the vertical convergence correction. Thus, six different correction interpolation point values are stored per point of intersection of grid lines in a memory of the video projector. The principle of convergence correction is then such that the six digital correction interpolation point values are read out synchronously with the movement of the electron beams in the three projection tubes and relayed to one digital/analogue converter each after interpolation. The convergence correction voltages are then present at the outputs of the D/A converters. Said voltages are applied via amplifiers to auxiliary coils which are arranged in parallel with the normal deflection coils on the projection tubes. The principle of convergence correction for video projectors is explained in more detail below with the aid of the block diagram in FIG. 2.

The reference symbol 200 denotes the antenna of the video projector. The antenna signal is conducted to a curing unit 205. The sound signals and video signal are separated from one another in a demodulator circuit 210. The sound signals are fed to the sound section 215. The corresponding sound section 215 emits the generated signals to the loudspeaker 220. The video signals are processed in a separate video section 225. The signals for the horizontal and vertical deflection are processed in a separate signal processing unit 230. The generated video signals are fed to the three projection tubes 260, 265 and 270 via separate amplifiers, 264, 269 and 274. The signals for the horizontal and vertical deflection are correspondingly also relayed to the deflecting units 263, 268 and 273 of the projection tubes. The radiated light of the projection tubes 260, 265 and 270 is projected onto a screen 280 via a deflecting mirror 275. The signals for the horizontal and vertical deflection are fed to a central processor 235 for the purpose of convergence correction. The central processor 235 is connected via an appropriate data bus to a non-volatile memory 240 and a volatile memory 245. An EPROM module, for example, can be provided as the non-volatile memory 240. A RAM module comes into consideration as the volatile memory. The central processor 235 is likewise connected to a digital/analogue converter array 250 via the data bus. This array contains 6 digital/analogue converters. 6 correction voltages are correspondingly present at the outputs of the D/A converter array 250. The 6 correction voltages are conducted via an amplifier unit 255 to the 6 correction coils 261, 262, 266, 267, 271, 272 of the three projection tubes. The correction coils 261, 266 and 271 serve the purpose of vertical convergence correction. Correction coils 262, 267 and 272 serve the purpose of horizontal convergence correction.

As already explained previously in the description of FIG. 1, the correction interpolation point values are stored in the non-volatile memory 240. The central processor 235 reads out the suitable correction interpolation point values synchronously with the course of the horizontal and vertical deflection signals and carries out the required vertical interpolation using the associated vertical and/or horizontal correction interpolation point values. In this process, the computing results are stored in the volatile memory 245. The results determined are then fed respectively to the associated D/A converter. The correction values must, of course, be available at the proper time so that the correct correction voltages are always present at the associated correction coils.

Figure 3:
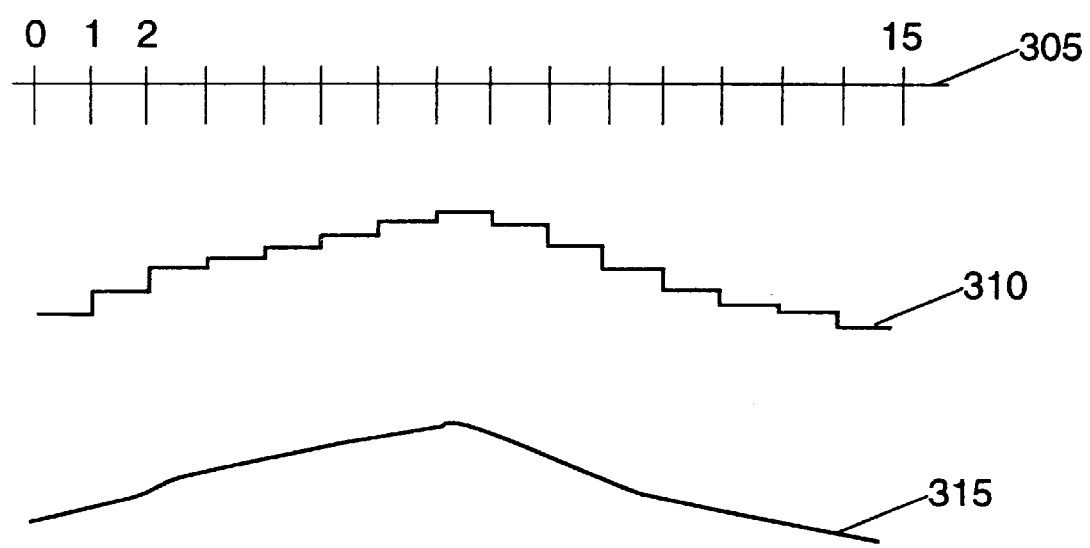
FIG. 3 shows the principle of how a horizontal convergence signal according to the invention is generated.

A horizontal grid line is represented in FIG. 3. 16 correction interpolation point values are stored for the convergence correction in the horizontal direction in the memory 240 for this grid line for each projection tube. No interpolation is carried out in the horizontal direction between the individual correction interpolation point values. The output signal at the digital/analogue converter is represented below the grid line 305 and has the reference symbol 310. It therefore has a stair-shape appearance. This stair-shape output signal must be integrated so that there are no discontinuities in the convergence correction. This is easily realized using RC filters. The integrated output signal is represented below the output signal of the D/A converter and has the reference symbol 315.

The correction signals cannot be so easily integrated in the vertical direction by means of RC filters. The signals do not have to be integrated against the reference signal, but the integration must be performed between the stored values on the vertical grid lines. Various methods are conceivable for interpolation in the vertical direction. The simplest method is linear interpolation between the grid points.

Figure 4:
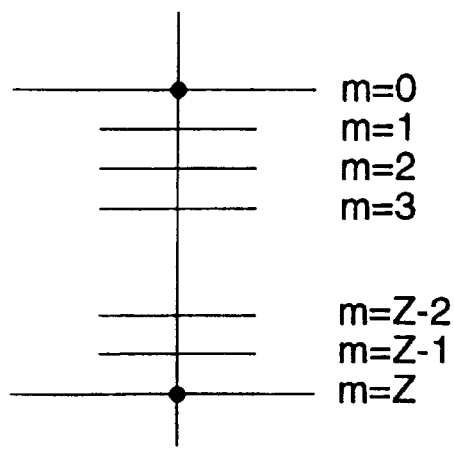
FIG. 4 shows a more precise representation of a grid field in the vertical direction with the video lines illustrated.

FIG. 4 represents a grid field which is bounded by two points of intersection of grid lines. The correction interpolation point values W0 and W1 are stored in a memory for the points of intersection. There are also a number of video lines situated between the points of intersection. The video lines are enumerated from 0 to Z using the running index m. A frequent subdivision of the grid system is such that 12 grid fields are provided and 26 video lines are present per grid field 26. According to FIG. 4, in linear interpolation, the correction value of the m-th line inside the grid field is calculated according to the formula:

$$|U_{corr\ m} = W0 + \frac{m \times (W1 - W0)}{Z}$$

in which W0 is the correction interpolation point value at the upper grid point, W1 is the correction interpolation point value at the lower grid point, m is the number of lines within the grid field, and Z is the number of lines per grid field.

Figure 5:
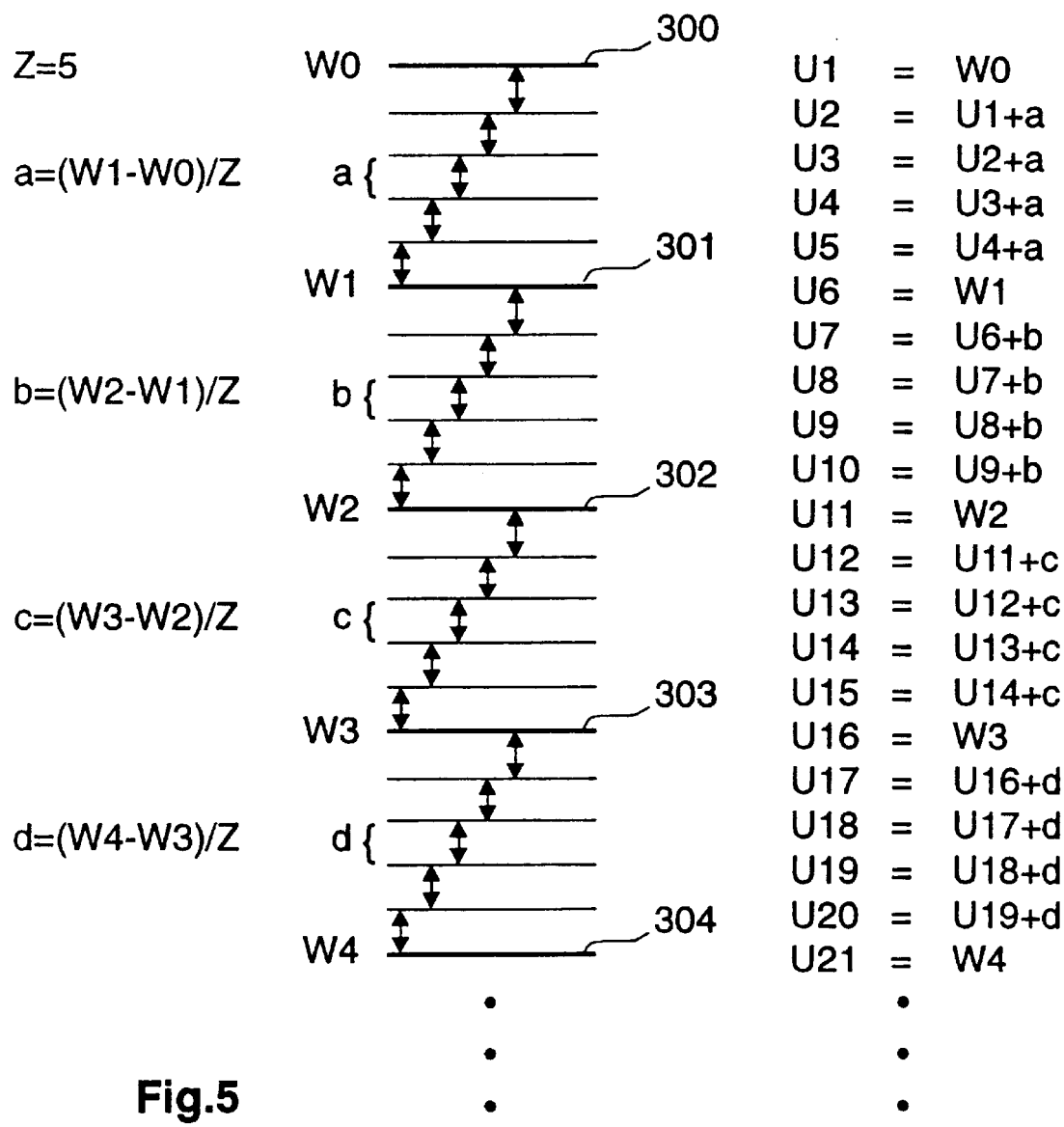
FIG. 5 shows the computing rules for a linear interpolation in a vertical direction.

The algorithm for calculating the correction values is represented in more detail in FIG. 5. The reference symbols 300 to 304 denote the uppermost 5 grid lines of the grid system. W0 to W4 denote the associated correction interpolation point values.

For the sake of simplicity, only four video lines are represented here between two grid lines. It is indicated next to the individual video lines in each case how the associated correction value is calculated. The correction value for the first video line which also corresponds to the first grid line is set equal to the correction interpolation point value W0. The correction value U2 for the second video line is calculated from the correction value of the preceding video line U1 multiplied by a correction step value a. The correction step value a is yielded by the following formula:

$$a = (W1 - W0)/Z.$$

The correction value U3 for the third video line is then calculated recursively from the correction value U2 according to the formula U3=U2+a. The correction values for U4 and U5 are also calculated correspondingly for the next video lines. The correction value of the sixth video line is then again set equal to the correction interpolation point value W1. The calculation then proceeds further as already previously explained for the first grid field. The difference resides only in that now it is not the correction step value a which is added in each case, but another correction step value, namely b. The latter is yielded by linear interpolation between the correction interpolation point values of the grid lines 301 and 302. The computing formula is:

$$b = (W2 - W1)/Z.$$

The correction step values c and d etc., are then calculated correspondingly for the next grid fields. The respective computing rule for calculating the correction values of the individual video lines can be gathered from FIG. 5.

The result of linear interpolation between the grid lines is now represented in more detail in FIG. 6. The reference symbol 320 denotes a vertical grid line. The reference symbol 325 denotes the curve for the correction interpolation point values. The reference symbol 330 denotes the interpolation curve. Viewing the output voltages in the vertical direction produces in each case between the grid lines output values which lie on a straight line with a specific gradient, but the values of the gradients differ from one another from one grid field to the next grid field. This means that the convergence correction added on from line to line differs from field to field, the consequence of which is the modulation of the spacing of the lines from field to field. This modulation of the spacing produces a brightness modulation from field to field. As regards the conversion adjustment, no disadvantage is to be seen on the screen of a projector which operates in the vertical direction with linear interpolation, but the brightness modulation generates very disturbing horizontal strips in the picture.

The hard field transitions are avoided by virtue of the fact that the correction step values calculated by linear interpolation are also permitted to have an effect from one field on the preceding field and the following field. In this case, the weight for the linearly interpolated correction step value is held constant within the reference field, and starting from the constant value at the field boundary to the reference field the weight in the preceding field and the following field is reduced to the value "0" at the opposite field end. That is to say, the data are evaluated from three fields in all the lines in this exemplary embodiment. The weight of the data in the associated reference field is equal to the sum of the weights of the data from the preceding and the following field. In this case, the weights of the data of the preceding field are reduced decrementally when the current video line approaches the lower current field edge, and the weights of the data in the following field are increased incrementally when the current video line approaches the lower field edge. Although the data obtained according to this principle deviate at the grid points from the correction interpolation point values stored there, the difference is so small that it does not have a disturbing effect on the image quality, or in order to reduce or eliminate the difference with respect to the ideal values, the stored correction interpolation point values can intentionally not be selected as ideal values but be overcompensated or undercompensated.

The problem of the upper and lower image margins will be examined further separately below.

A first possibility of realizing this principle is represented in FIG. 7. The same reference symbols have the same meaning here as was already previously explained in FIG. 5. In addition to the grid lines 300 to 304, the grid lines 305, 306 and 307 are represented at the lower image margin. Moreover, two grid lines 299 and 308 are also represented, in addition. The latter serve to solve the edge problem already mentioned previously, and will be explained more precisely below. The correction value U1 for the first video line 300 no longer corresponds simply to the correction interpolation point value W0, but is yielded by the following formula:

$$U1=W0-m+(P\times K+Q\times L+R\times L+V\times K)/(2\times Z).$$

It is directly specified in FIG. 7 next to line 300 which magnitudes are to be used for the individual variables K, L, P, Q, R, V. The magnitude Z corresponds in this case to the number of video lines per grid field, that is to say to the value 5. The magnitude a corresponds again to the correction step value for the first field, as already explained previously when explaining FIG. 5. The magnitude m corresponds to the correction step value for the zeroth field and is calculated according to the following formula:

$$m=(W0-im01)/Z.$$

It is specified next to the second video line how the correction value is calculated for the second video line. The computing formula for this is:

$$U2=U1+(P\times K+Q\times L+R\times L+V\times K)/(2\times Z).$$

All other correction values for the following lines are calculated according to a formula corresponding to this computing rule, as is also specified next to the third video line. Of course, it is necessary in each case to select the correction step values of the three fields involved, specifically the current grid field, previous grid field and subsequent grid field.

It is to be taken into consideration that the correction step value of the current grid field occurs twice in each case in the computing rule, with the result that a constant weight is always produced for this correction step value in the sum. The seventh video line may be considered as an example. The term $Q\times L$ amounts here to $1\times b$, and the term $K\times V$ amounts here to $4\times b$, with the result that the value $5\times b$ is produced in the sum. There is an entirely corresponding result in the other video lines of this grid field.

The additional grid lines 299 and 308 serve to eliminate the edge value problem in the interpolation. Correction interpolation point values im01 and im13 are simply additionally stored in the memory for these grid lines. The correction interpolation point value im01 is yielded, for example, from the correction interpolation point values W0, W1 and W2 according to the following formula:

$$im01=W0-(W1-W0)+((W2-W1)-(W1-W0))) \quad im01=3W0-3W1+W2.$$

The correction interpolation point value im13 is then calculated, for example, according to the following formula:

$$im13=W12+(W12\times W11)-((W11-W10)-(W12-W11))) \quad im13=3W12\times 3W11+W10$$

The correction step values m, n are yielded exactly as specified in the other grid fields. The corresponding formulae are also likewise specified in FIG. 7. However, it is to be pointed out further in this connection that the weight of the correction step value of the preceding grid field is decremented with increasing spacing of the current video line from the preceding grid field. Conversely, the weight of the correction step value for the following field is incremented with decreasing spacing of the current video line from the following field. The changes in the weights K and L in the case of the second grid field are given by way of example. The second grid field is bounded by the grid lines 301 and 302.

A second form of realization of the interpolation method according to the invention is represented in FIG. 8. The same reference symbols have the same meaning here as in the preceding figure of FIG. 7. The difference as compared with the first form of realization consists in that there are here now three serial variables K, L, M for the weights of the three correction step values of the three fields involved, specifically the current grid field, the preceding grid field and the following grid field. As a result, a double variable is eliminated for the correction step value of the current grid field. The computing rule for calculating the correction values of each video line is thereby also slightly simplified. The two terms $Q\times L$ and $V\times K$ are combined to form the term $V\times M$ in the new exemplary embodiments. It is clearly to be seen that in calculating the current video line within the current grid field the weight for the correction step value of the current grid field remains constant in each case.

The calculation of the additional correction interpolation point values im01 and im13 requires an additional outlay on computation. In particular, if these values are to be calculated as ideally as possible the outlay on computation for this can rise. In order to prevent this additional outlay, the realization can be selected somewhat differently. An example of a different realization is represented in FIG. 9. No additional correction interpolation point values are stored in this realization. Instead of this, when calculating the first video line a starting value is added to the correction interpolation point value W0 provided for this video line. This starting value concludes the threes sequence for the current grid field with the correction step value a. The starting value corresponds to the sum of the summed weighted correction step values a for the case in which a further field were also to be provided above the current grid field. The starting value therefore corresponds to the following formula:

$$\text{starting value}=\Sigma(Q\times L)=a\times((Z-1)^2+(Z-1))/2.$$

After traversal of the second grid field, the influence of this starting value is made up for again, and the interpolation curve obtained again runs ideally. Except for the first video line, all the following video lines are calculated according to a computing rule corresponding to the following computing rule:

$$U2=U1+(P\times K+Q\times L+V\times M)/(K+L+M).$$

The associated computing rules and magnitudes can again be taken from FIG. 9.

FIG. 10 represents the difference in the correction values of two neighbouring video lines, on the one hand in the case of the linear interpolation method, reference symbol 335, and, on the other hand, in the case of the interpolation method in accordance with FIG. 9, reference symbol 340. The video line number is given on the abscissa, and the correction value difference from line to line is given on the ordinate. It is clearly to be seen that in the curve for the linear interpolation method discontinuities occur in the correction value differences upon transition from one grid field to the next. By contrast, no discontinuity is present in the case of the interpolation method in accordance with FIG. 9. A knee occurs in the curve only in the edge regions, that is to say upon transition from the first grid field to the second grid field; likewise, in the case of transition from the last but one grid field to the last grid field. In order also still largely to prevent this effect, it is still possible to vary the computing rule for the correction values in addition within the first and last grid field.

A further possibility of realization is represented for this purpose in FIG. 11. The representation corresponds to the preceding representations in FIGS. 9, 8 and 7. The chief reason for the knee in the curve of FIG. 10 is that in the realization in accordance with FIG. 9 the starting value was added only in the case of the calculation of a correction value for the first video line. In order to weaken this strong effect, the starting value is subdivided into a plurality of individual summands and added on in steps beginning, in each case, from the calculation of the correction values for the second video line. Specifically, it is added on when the weight undergoes decrementation, with the result that the influence decreases with increasing distance of the current video line from the edge. The curve represented in FIG. 10 is therefore raised in the first grid field and the knee is thereby weakened. The same principle is also applied in calculating the correction values in the last grid field. Here, however, the influence of the edge correction increases towards the edge in each case when the weight undergoes incrementation, and in the case of the last line an amount is added on which ensures that the gradient of the interpolation curve does not suddenly experience a discontinuity. The associated computing rules can be gathered from FIG. 11. The result of this realization is represented in FIG. 12. FIG. 12 corresponds in this case to FIG. 10. It is clearly to be seen in the case of curve 345 that the knee is plainly weakened in the edge regions.

A still further possibility of realization is represented in FIG. 13. This computing method follows from mathematical conversion of the computing method in accordance with FIG. 11. It is designed such that the calculation of the correction values for each video line is now performed independently of a preceding video line. The computing rule for each video line is the same up to the first and last field. All the mathematical expressions and magnitudes are represented in a self-explanatory fashion in FIG. 13 and do not need to be explained in more detail here.

The methods represented can be modified in many ways.

An exemplary embodiment with the following parameters was selected for the method represented:

1. The grid spacing is 5 lines.
2. 12 horizontal grid lines were selected.
3. The neighbouring fields were influenced over the entire region.
4. The data from a preceding field and a following field were used for a current field.
5. Incrementation and decrementation of the data from the neighbouring fields was carried out linearly.

All 5 variables can be varied independently of one another. The formulae must then be appropriately adapted.

In particular, it is possible, for example, that the correction step value of the preceding field is considered only for the calculation of the interpolation values in an upper part of the current grid field, while the correction step value of the following grid field is considered only for the calculation of the interpolation values in a lower part of the current grid field. Of course, a different subdivision than into a top and bottom part of the current grid field also comes into consideration.

It is, for example, also to be regarded as within the scope of the invention if consideration is given not only to the data from three grid fields involved for the interpolation, but also to more, if appropriate. The method can be expediently employed wherever interpolation must be performed between interpolation point values. Of course, the interpolation point values need not be necessarily permanently stored, but can also be transmitted. In particular, it is also therefore possible to conceive of error correction in transmitted audio data as an application.

What is claimed is:

1. A method for interpolation, comprising the steps of:

defining interpolation intervals between each adjacent pair of a plurality of original interpolation values;

designating a set of interpolation locations within each said interpolation interval;

assigning a correction step value between each said pair of original values relating to a linear rate of change defined by the respective magnitudes of the original values and their respective distances from said interpolation locations;

calculating interpolation values for each said interpolation location in a given interpolation interval based upon said assigned step values for said given interpolation interval and said interpolation intervals before and after said given interpolation interval; and, generating an output signal from said original values and said interpolation values.

2. A method according to claim 1, comprising the step of using the correction step value of the interpolation intervals before or after said given interval only in subregions of said given interval during said calculating step.

3. A method according to claim 1, comprising the step of weighting the correction step values of the interpolation intervals before and after the given interpolation interval in accordance with the location of the interpolation value being calculated during said calculating step.

4. A method according to claim 3, comprising the step of weighting the correction step value for the interpolation interval before said given interval with a weighting value that decreases with increasing distance of the location of the interpolation value being calculated.

5. A method according to claim 3, comprising the step of weighting the correction step value for the interpolation interval after said given interpolation interval with a weighting value that increases with decreasing distance of the location of the interpolation value being calculated.

6. A method according to claim 2, comprising the step of weighting the correction step value for the interpolation interval before said given interpolation interval with a weighting value that is reduced decrementally during a transition from one location of an interpolation value to be calculated to the next location of an interpolation value to be calculated.

7. A method according to claim 2, comprising the step of weighting the correction step value for the interpolation interval after said given interval with a weighting value that is increased incrementally during any change from one location of an interpolation value being calculated to the next location of an interpolation value being calculated.

8. A method according to claim 2, comprising the step of maintaining a weight of the correction step value for the current interval constant when calculating the interpolation values within the given interval.

9. A method according to claim 1, comprising the step of adding a starting value to at least the first interpolation value of the first interpolation location of a first given interval.

10. A method according to claim 9, further comprising the step of adding contributions of weighted correction step values of the first interval in the case of a fictional calculation of interpolation values for an interval situated before the first interval to obtain a starting value.

11. A method according to claim 1, further comprising the step of adding additional weighted correction step values of the first interval, which originate from a fictional calculation of interpolation values for an interval situated before the first interval to the interpolation values in the first interval of the region.

12. A method according to claim 11, further comprising the step of decreasing weights of the additional correction step values of the first interval with increasing distance of the position of the interpolation value currently to be calculated within the first interval from the boundary of the region.

13. A method according to claim 1 further comprising the step of adding additional weighted correction step values, which originate from a fictional calculation of interpolation values for an interval situated after the last interval to the interpolation values in the last interval of the region.

14. A method according to claims 13, further comprising the step of increasing the weights of the additional correction step values of the last interval with decreasing distance of the position of the interpolation values currently to be calculated within the last interval from the boundary of the region.

15. A method according to claim 13, further comprising the step of calculating the last interpolation values of the last interval, by adding an amount thereto in order to keep the gradient of the interpolation curve constant.

16. A method according to claim 1 further comprising the step of adding at least one interpolation point value at each boundary of a region defined by said interpolation intervals to expand the region.

17. A method according to claim 16, further comprising the step of interpolating starting from the three most closely neighbouring interpolation point values to determine additional interpolation point values in each case.

18. A method according to claim 17, further comprising the step of calculating the first additional interpolation point value according to the formula:

$$im01 = 3W0 - 3W1 + W2$$

wherein W0, W1 and W2 are the three most closely neighbouring interpolation point values.

19. A method according to claim 17, further comprising the step of calculating the second additional interpolation point value according to the formula:

$$im13 = 3W12 - 3W11 + W10$$

wherein W10, W11, W12 are the three most closely neighbouring interpolation point values.

20. A method according to claim 1, further comprising the step of calculating the interpolation values in each case using a computing rule which is independent of the result of a preceding calculation of an interpolation value.

21. A method according to claim 1 further comprising the step of calculating the interpolation values in each case using a recursive computing rule, use being made in each case of the result of the preceding calculation of an interpolation value.

22. An apparatus for generating correction voltages for convergence adjustment in a video projector, said device including:

means for defining interpolation intervals between each adjacent pair of a plurality of original interpolation values;

means for designating a set of interpolation locations within each said interpolation interval;

means for assigning a correction step value between each said pair of original values relating to a linear rate of change defined by the respective magnitudes of the original values and their respective distances from said interpolation locations;

means for calculating interpolation values for each said interpolation location in a given interpolation interval based upon said assigned step values for said given interpolation interval and said interpolation intervals before and after said given interpolation interval; and, means for generating an output signal from said original values and said interpolation values.

23. Method according to claim 1, further comprising the step of generating correction voltages for convergence adjustment in a video projector from said output signals.

24. Method according to claim 1, further comprising the step of generating a waveform from said original values and said interpolation values.

* * * * *